(12) United States Patent
Huang (10) Patent No.: US 7,836,560 B2
(45) Date of Patent: *Nov. 23, 2010

(54) FASTENER FOR STRAPS

(76) Inventor: Han-Ching Huang, No. 12, Alley 111, Lane 437, Chen Hsing Road, Taichung (TW)

(*) Notice: Subject to any disclaimer, the term of this patent is extended or adjusted under 35 U.S.C. 154(b) by 80 days.

This patent is subject to a terminal disclaimer.

(21) Appl. No.: 11/747,326

(22) Filed: May 11, 2007

(65) Prior Publication Data

US 2008/0148537 A1 Jun. 26, 2008

Related U.S. Application Data

(63) Continuation-in-part of application No. 11/615,214, filed on Dec. 22, 2006, now Pat. No. 7,281,701.

(51) Int. Cl.
*B21F 9/00* (2006.01)

(52) U.S. Cl. .................. 24/68 CD; 24/68 B; 24/909; 254/218; 254/238

(58) Field of Classification Search ............... 24/68 CD, 24/909, 68 R, 68 B, 68 E; 254/217, 218, 254/237, 238, 213, 223
See application file for complete search history.

(56) References Cited

U.S. PATENT DOCUMENTS

| | | | |
|---|---|---|---|
| 6,641,116 B1 * | 11/2003 | Huang | 254/218 |
| 7,093,327 B2 | 8/2006 | Huang | 24/68 CD |
| 7,281,701 B1 * | 10/2007 | Huang et al. | 254/218 |
| 7,350,767 B2 * | 4/2008 | Huang | 254/218 |
| 2006/0197071 A1 | 9/2006 | Huang | 254/217 |
| 2007/0189873 A1 * | 8/2007 | Breeden | 410/100 |

OTHER PUBLICATIONS

TW 225765, 6 pages, 1994.

* cited by examiner

*Primary Examiner*—Jack W. Lavinder
(74) *Attorney, Agent, or Firm*—Banger Shia (57) ABSTRACT

A fastener includes a frame, a handle and a reel inserted through the frame and handle so that a strap can be reeled when the reel is rotated. Two bushings are connected to the frame for protecting the reel from the handle or the frame. Two ratchet wheels are connected to the reel. A first detent is movable on the frame for engagement with the ratchet wheels. A second detent is movable on the handle for engagement with the ratchet wheels.

10 Claims, 11 Drawing Sheets

FASTENER FOR STRAPS

CROSS-REFERENCE

The present application is a continuation-in-part application of U.S. patent application Ser. No. 11/615,214, filed on Dec. 22, 2006, now U.S. Pat. No. 7,281,701, of which the entire disclosure is incorporated herein.

BACKGROUND OF INVENTION

1. Field of Invention

The present invention relates to a fastener for straps.

2. Related Prior Art

Figure 11:
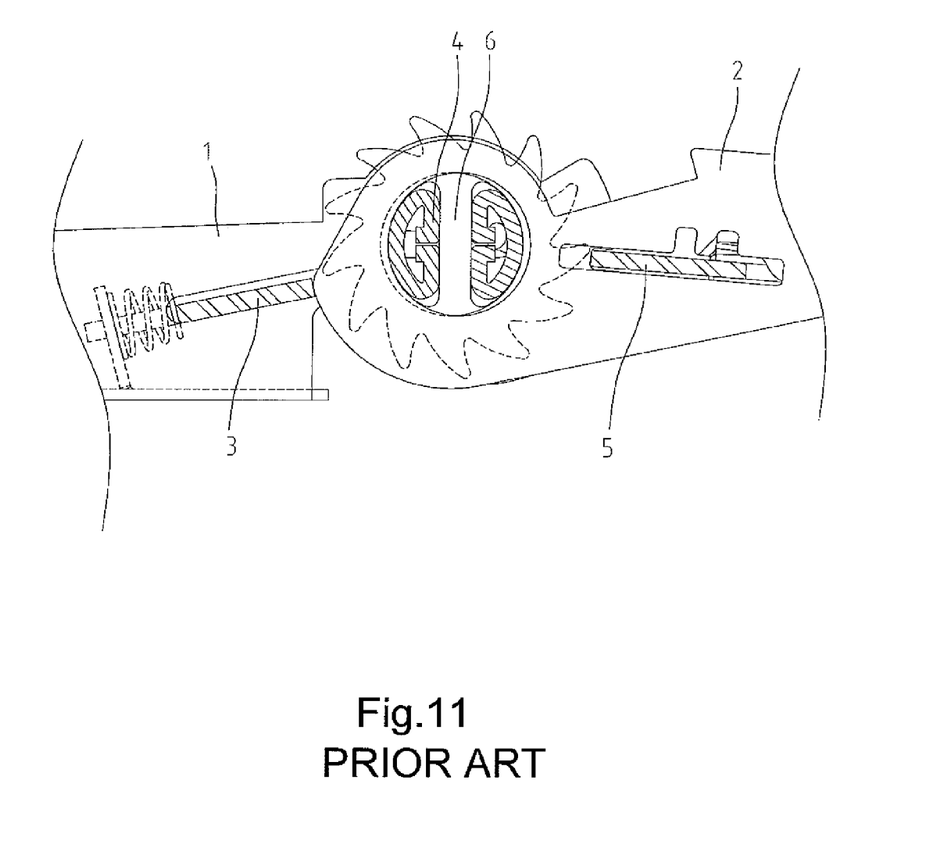
FIG. 11 is a fragmentary, side view of a conventional fastener.

Taiwanese Patent Publication No. 225765 discloses a conventional fastener. The fastener includes a reel 4, a first handle 1 connected to the reel 4, a second handle 2 connected to the reel 4, two ratchet wheels 6 connected to the reel 4, a first spring-loaded detent 3 located on the first handle 1 and a second spring-loaded detent 5 located on the second handle 2. A first strap B is connected to the first handle 1 while a second strap B is connected to the reel 4. The first handle 1 includes two walls each including a first arched edge, a second arched edge and a shoulder 12 between the first and second arched edges. The second handle 2 includes two cams. To fasten the straps B, the second handle 2 is pivoted from the first handle 1. The pivoting is limited by the second spring-loaded detent 5 against the shoulders 12 of the first handle 1. To loosen the straps B, the second spring-loaded detent 5 is moved onto the second arched edges of the first handle 1 and therefore kept from the ratchet wheels 6 while the first spring-loaded detent 3 is disengaged from the ratchet wheels 6 by the cams of the second handle 2. However, it is difficult to reel in the second strap B. Referring to FIG. 11 of the drawings of the present application, the second arched edges of the first handle 1 are pushed by the second spring-loaded detent 5 while the cams of the second handle 2 are pushed by the first spring-loaded detent 3 so that the reel 4 is "handcuffed" by the handles 1 and 2.

The present invention is therefore intended to obviate or at least alleviate the problems encountered in the prior art.

SUMMARY OF INVENTION

According to the present invention, a fastener includes a frame, a handle and a reel inserted through the frame and handle so that a strap can be reeled when the reel is rotated. Two bushings are connected to the frame for protecting the reel from the handle or the frame. Two ratchet wheels are connected to the reel. A first detent is movable on the frame for engagement with the ratchet wheels. A second detent is movable on the handle for engagement with the ratchet wheels.

The primary advantage of the fastener according to the present invention is free reeling of the strap, since the protective units keep the reel from the handle or the frame.

Other advantages and features of the present invention will be apparent from the following description referring to the drawings.

BRIEF DESCRIPTION OF DRAWINGS

The present invention will be described via detailed illustration of five embodiments referring to the drawings.

DETAILED DESCRIPTION OF EMBODIMENTS

Referring to the FIGS. 1 through 4, there is shown a fastener according to a first embodiment of the present invention.

The fastener includes a frame 10, a reel 12, two ratchet wheels 13, a handle 20, two bushings 30, a first detent 14 and a second detent 22.

The frame 10 includes two walls on a floor. Each wall includes a first side 110 and a second side 111. Each of the walls of the frame 10 includes an aperture 102 in a first end, two indentations 104 in communication with the aperture 102, a first arched edge 101 at the first end, a second arched edge 106, a cutout 103 in the second arched edge 106, a shoulder 108 between the arched edges 101 and 106 and a slot 109 therein. A cross bar 11 extends between the second, opposite ends of the two walls of the frame 10.

The handle 20 includes two walls and a grip 21 between the walls. Each of the walls of the handle 20 includes cam 202 at an end, a slot 203 therein and a boss 204 thereon within the slot 203. An aperture 201 is defined in each of the cams 202.

The two bushings 30 each include an annular ridge 301, two bosses 302, and a retaining surface 303. The annular ridge 301 is adapted to insert through the aperture 102 of the frame 10, and the retaining surface 303 is adapted to abut against the first side 110 of the wall so as to keep the bushing 30 connected to the frame 10. Each boss 302 is adapted to insert in the indentation 104 formed on each wall of the frame 10 so that the bushings 30 are not rotatable with respect to the frame 10.

The reel 12 is rotationally inserted in the apertures 201 of the handle 20, the bushings 30 and the apertures 102 of the frame 10. The annular ridge 301 is inserted in the apertures 201.

Each of the ratchet wheels 13 includes ratchets 131. The ratchet wheels 13 are non-rotationally connected to the reel 12.

The first detent 14 includes two fins 141 inserted through the slots 109 of the walls of the frame 10 for engagement with the ratchets 131 of the ratchet wheels 13. A spring is compressed between the first detent 14 and a tab raised from the floor of the frame 10 for keeping the fins 141 engaged with the ratchets 131.

The second detent 22 includes two fins 221 inserted through the slots 203 of the walls of the handle 20 for engagement with the ratchets 131 of the ratchet wheels 13. The second detent 22 includes a grip 222 thereon and an aperture 223 therein.

An elastic element 23 is provided between the second detent 22 and a portion of the handle 20 for keeping the fins 221 engaged with the ratchets 131. The elastic element 23 is a torque spring with a helical portion, a first end extending from the helical portion and a second end extending from the helical portion. The helical portion of the spring 23 is mounted on the boss 204 of one of the walls of the handle 20. The first end of the spring 23 is located against the wall of the handle 20. The second end of the spring 23 is inserted through the aperture 223 of the second detent 22.

The reel 12 is protected from the handle 20 by the annular ridge 301 inserted in the apertures 201. That is, the reel 12 is not clamped by the handle 20 and the frame 10 and therefore can easily be rotated.

Figure 1:
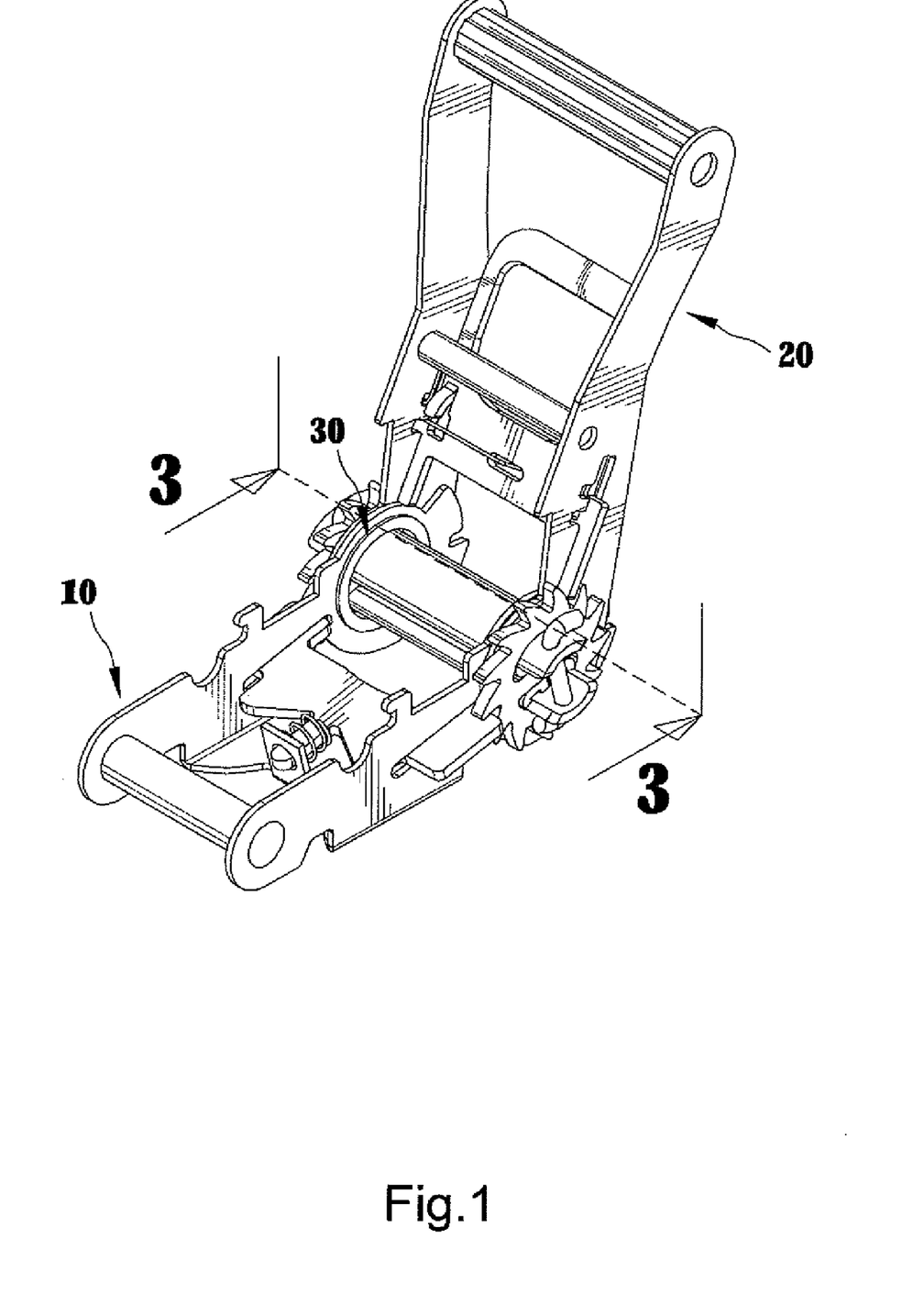
FIG. 1 is a perspective view of a fastener according to the first embodiment of the present invention.
Figure 2:
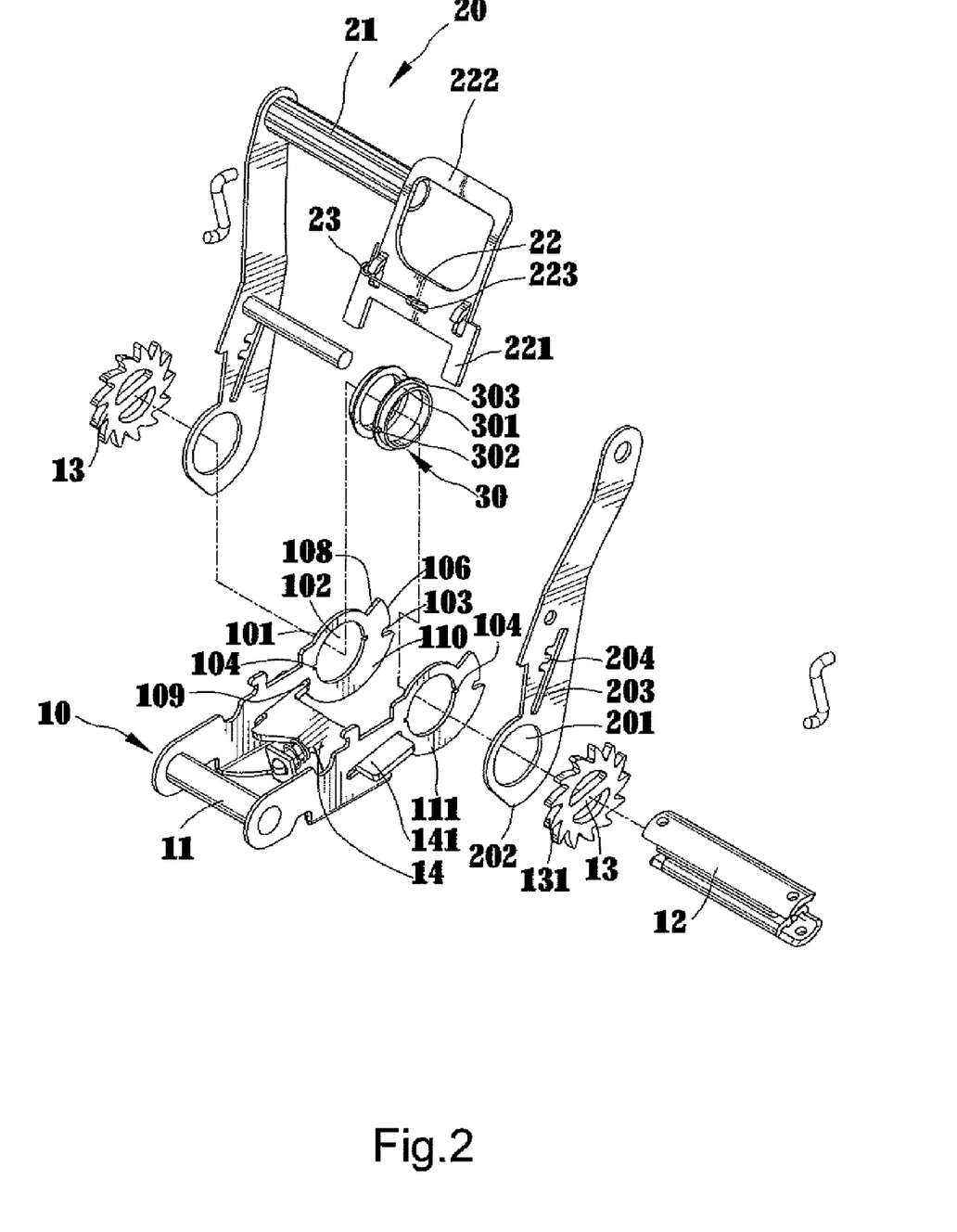
FIG. 2 is an exploded view of the fastener shown in FIG. 1.
Figure 3:
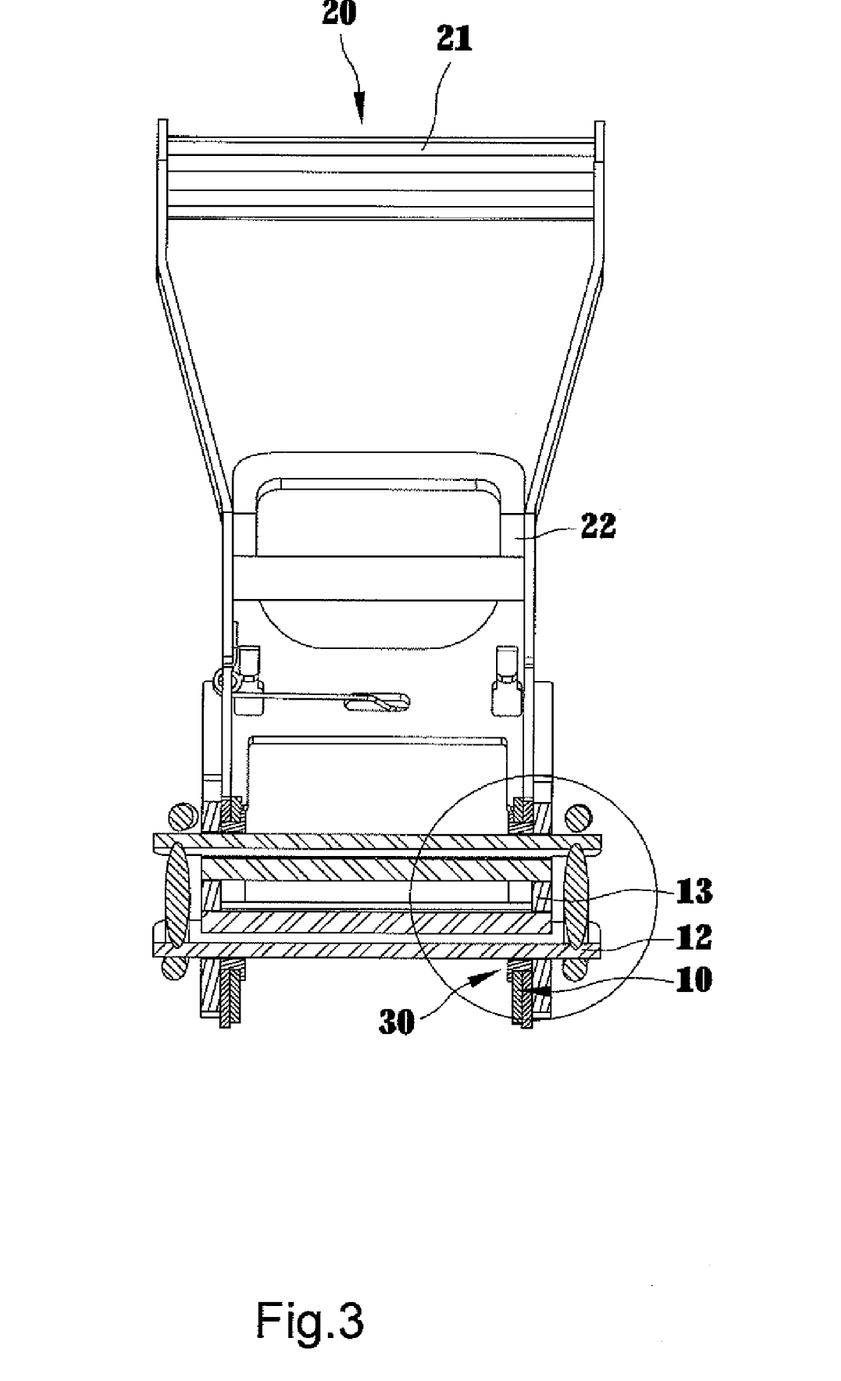
FIG. 3 is a cross-sectional view of the fastener taken along line 3-3 in FIG. 1.
Figure 4:
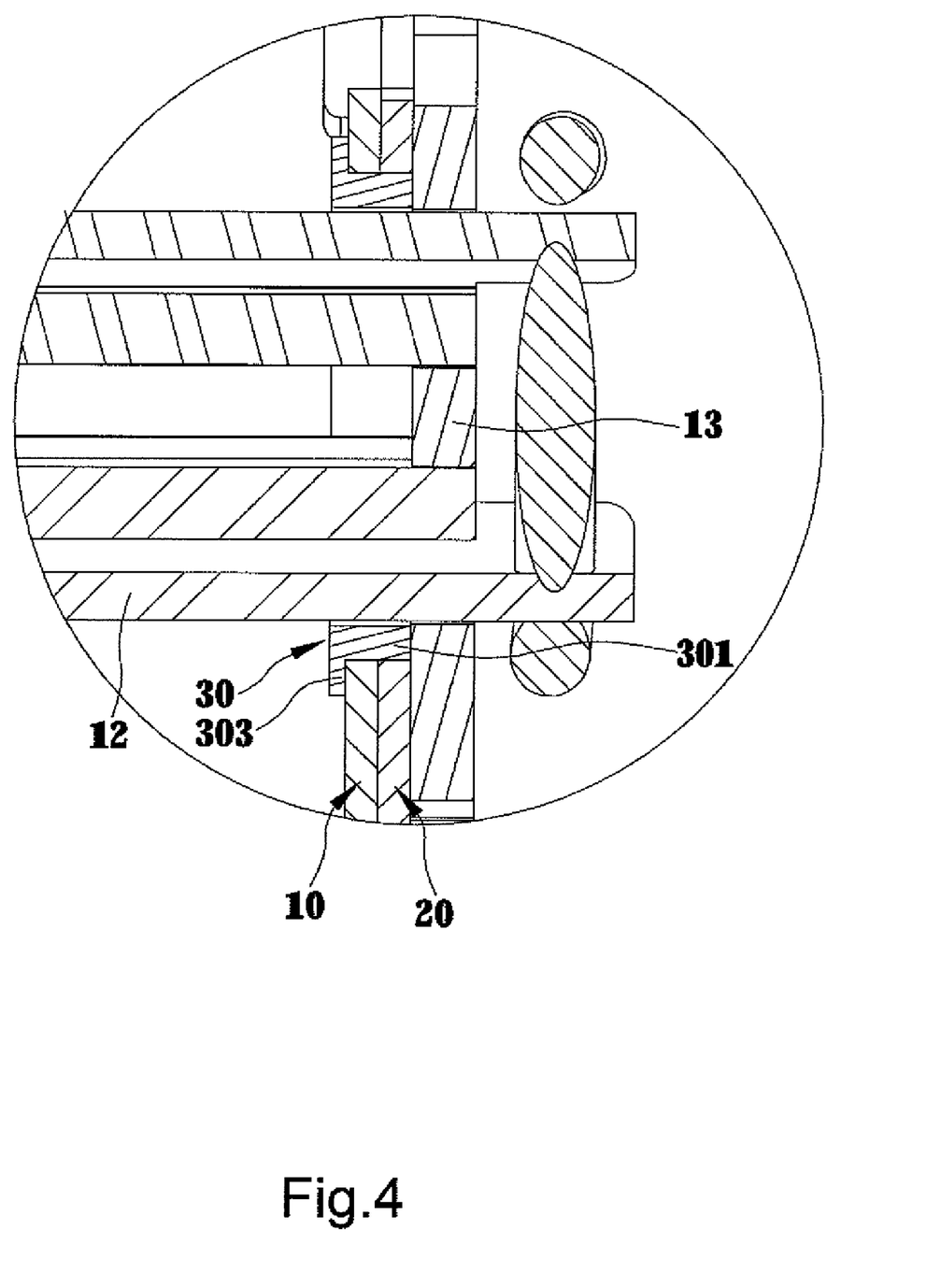
FIG. 4 is a partial, enlarged view of the fastener shown in FIG. 3.
Figure 5:
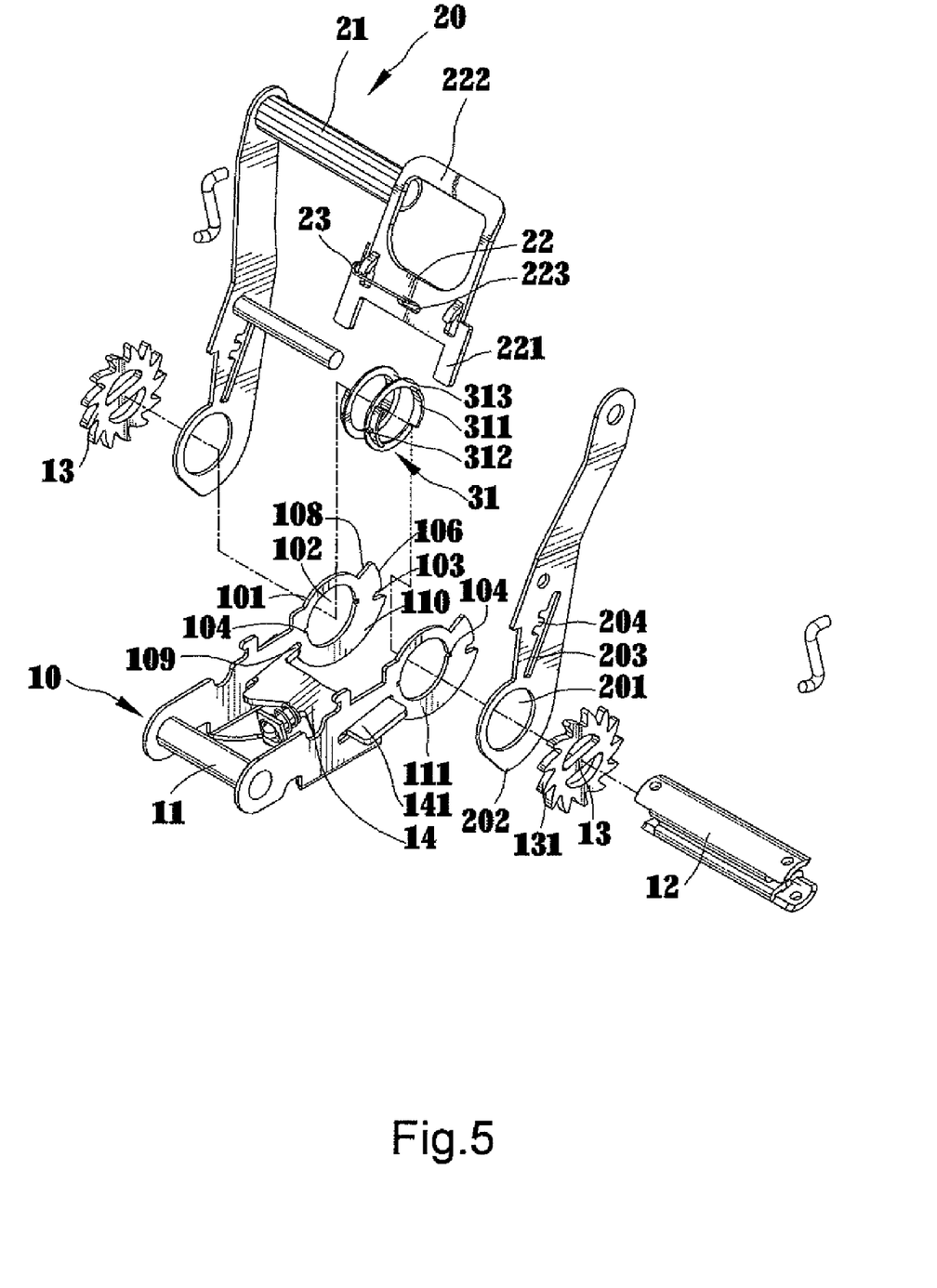
FIG. 5 is an exploded perspective view of a fastener according to the second embodiment of the present invention.
Figure 6:
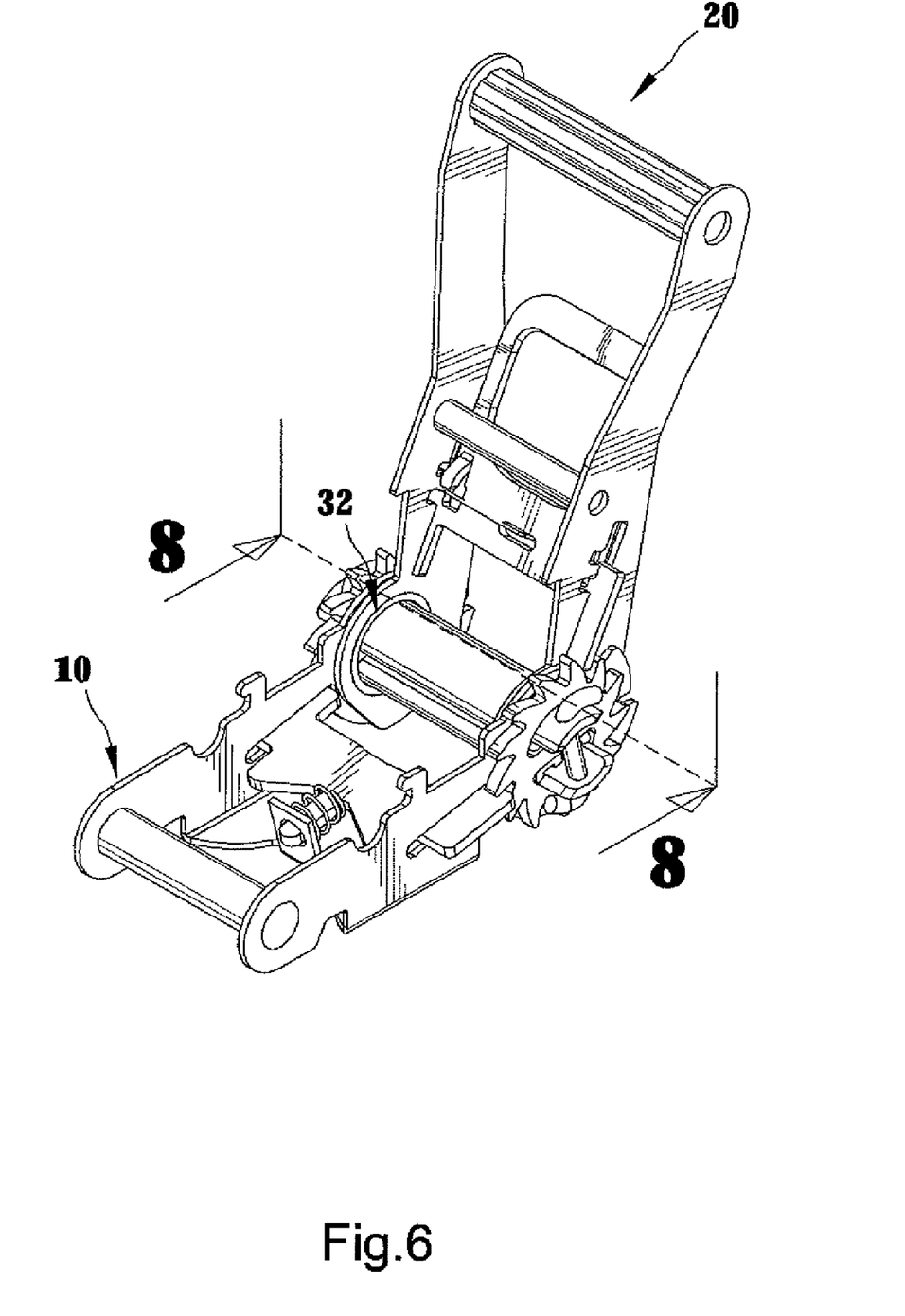
FIG. 6 is a perspective view of a fastener according to the third embodiment of the present invention.
Figure 7:
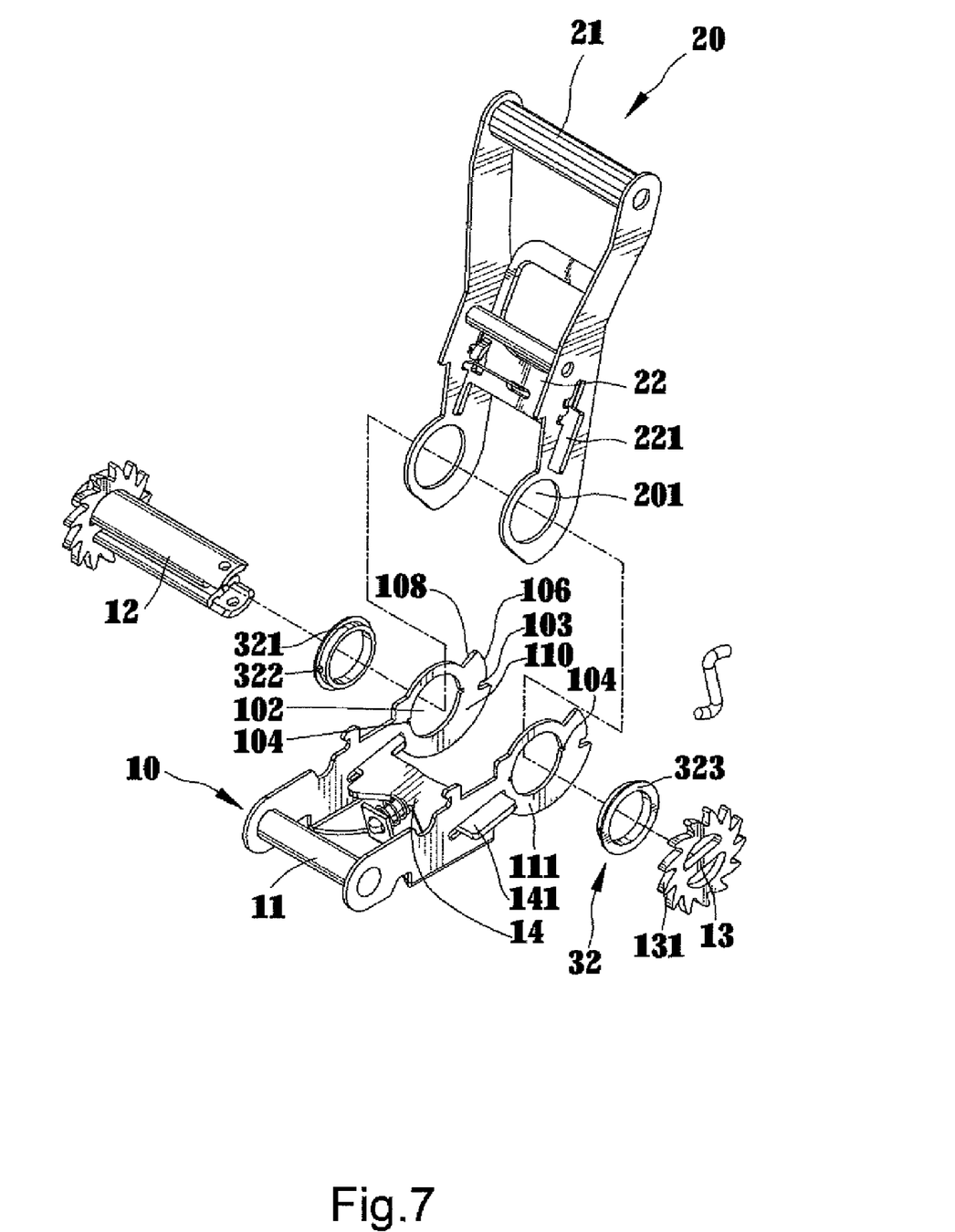
FIG. 7 is an exploded perspective view of the fastener shown in FIG. 6.
Figure 8:
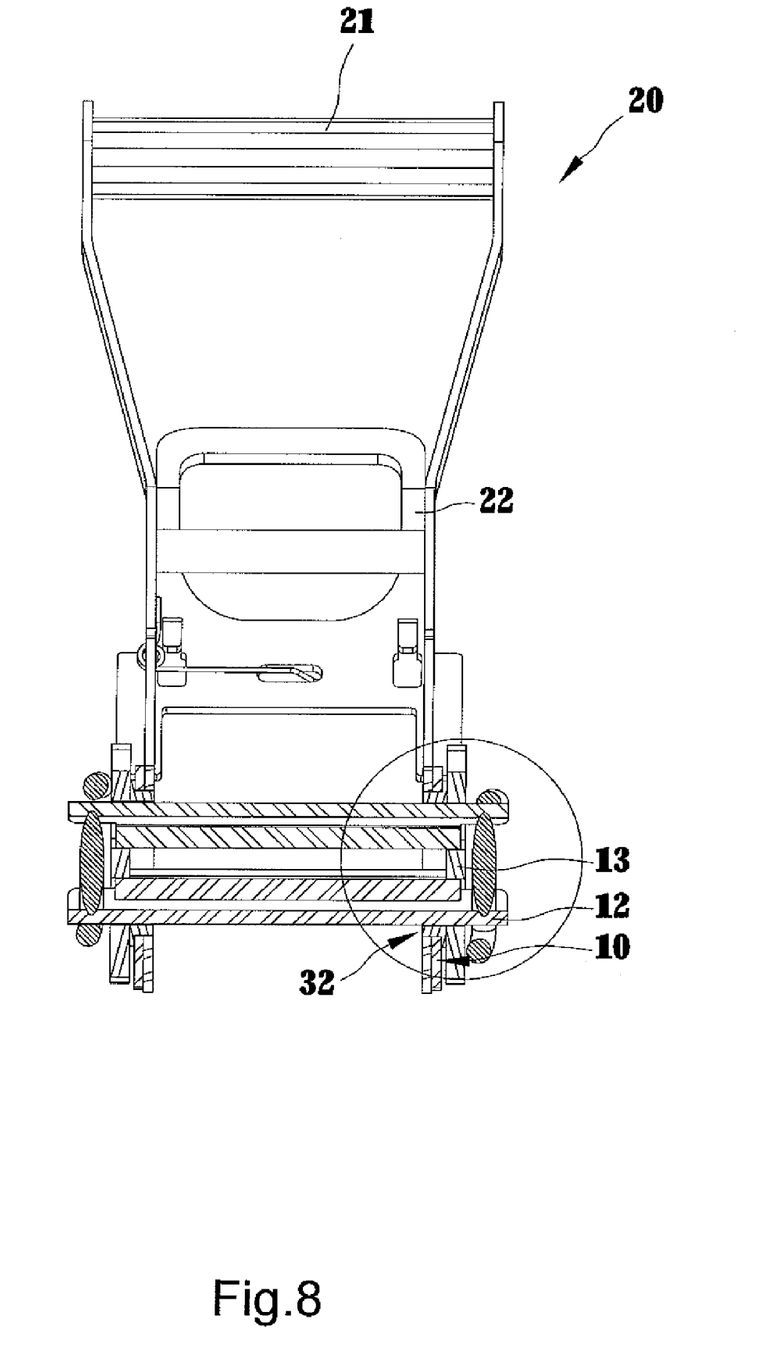
FIG. 8 is a cross-sectional view of the fastener taken along line 8-8 in FIG. 6.
Figure 9:
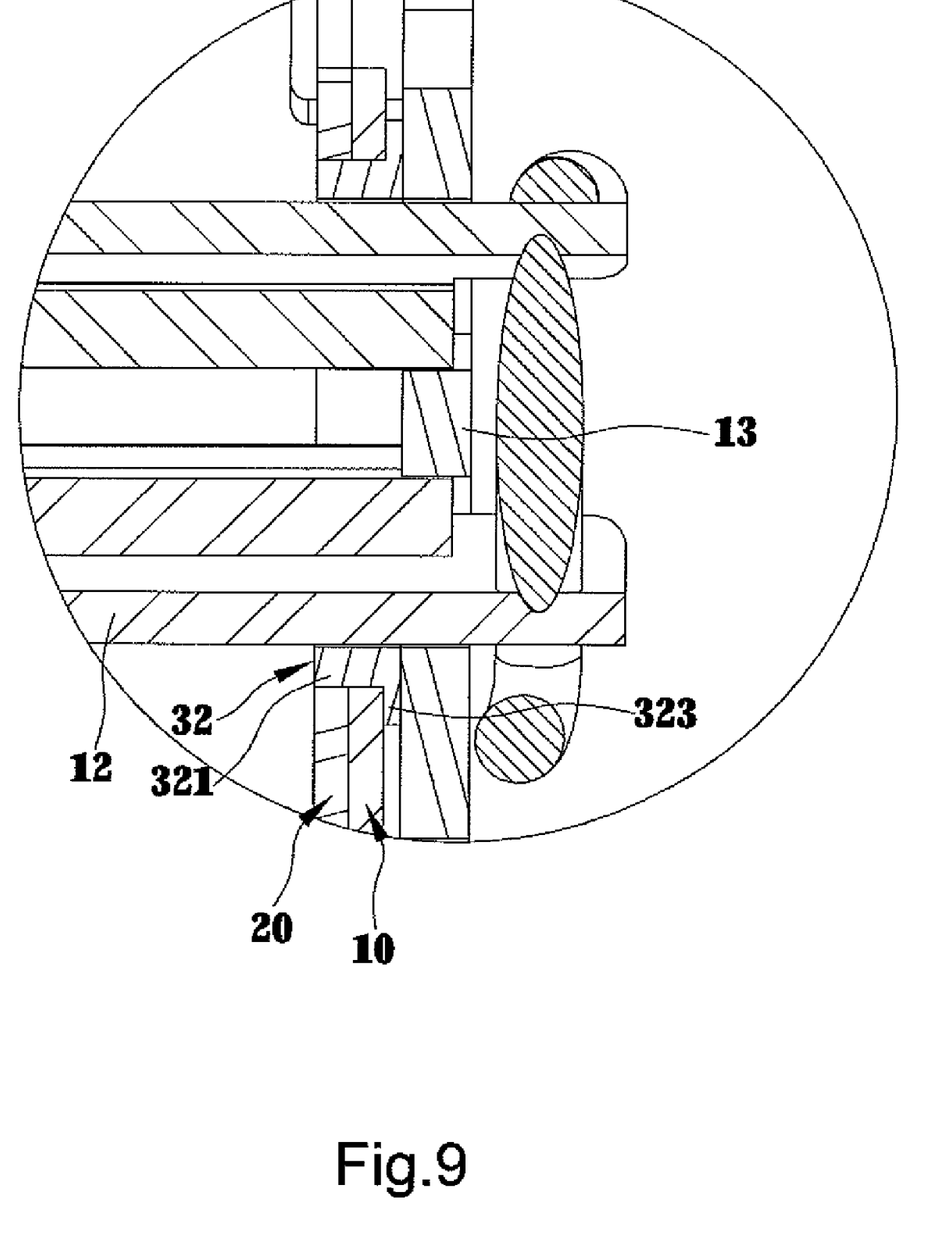
FIG. 9 is a partial, enlarged view of the fastener shown in FIG. 8.

Referring to FIG. 5, there is shown a fastener according to a second embodiment of the present invention. The second embodiment differentiates from the first embodiment in that the two bushings 30 are replaced by two bushings 31. Each of the bushings 31 includes two arched ridges 311, two bosses 312 and a retaining surface 313. The arched ridges 311 are adapted to insert through the aperture 102 of the frame 10, and the retaining surface 313 is adapted to abut against the first side 110 of the wall so as to keep the bushing 31 connected to the frame 10. Each boss 312 is adapted to insert in the indentation 104 formed on each wall of the frame 10 so that the bushings 31 are not rotatable with respect to the frame 10.

Referring to FIGS. 6 through 9, there is shown a fastener according to a third embodiment of the present invention. The third embodiment differentiates from the first embodiment in that the two bushings 30 are replaced by two bushings 32. Each of the bushings 32 includes an annular ridge 321, two bosses 322 and a retaining surface 323. The annular ridge 321 is adapted to insert through the aperture 102 of the frame 10, and the retaining surface 323 is adapted to abut against the second side 111 of the wall so as to keep the bushing 32 connected to the frame 10. Each boss 322 is adapted to insert in the indentation 104 formed on each wall of the frame 10 so that the bushings 32 are not rotatable with respect to the frame 10.

Figure 10:
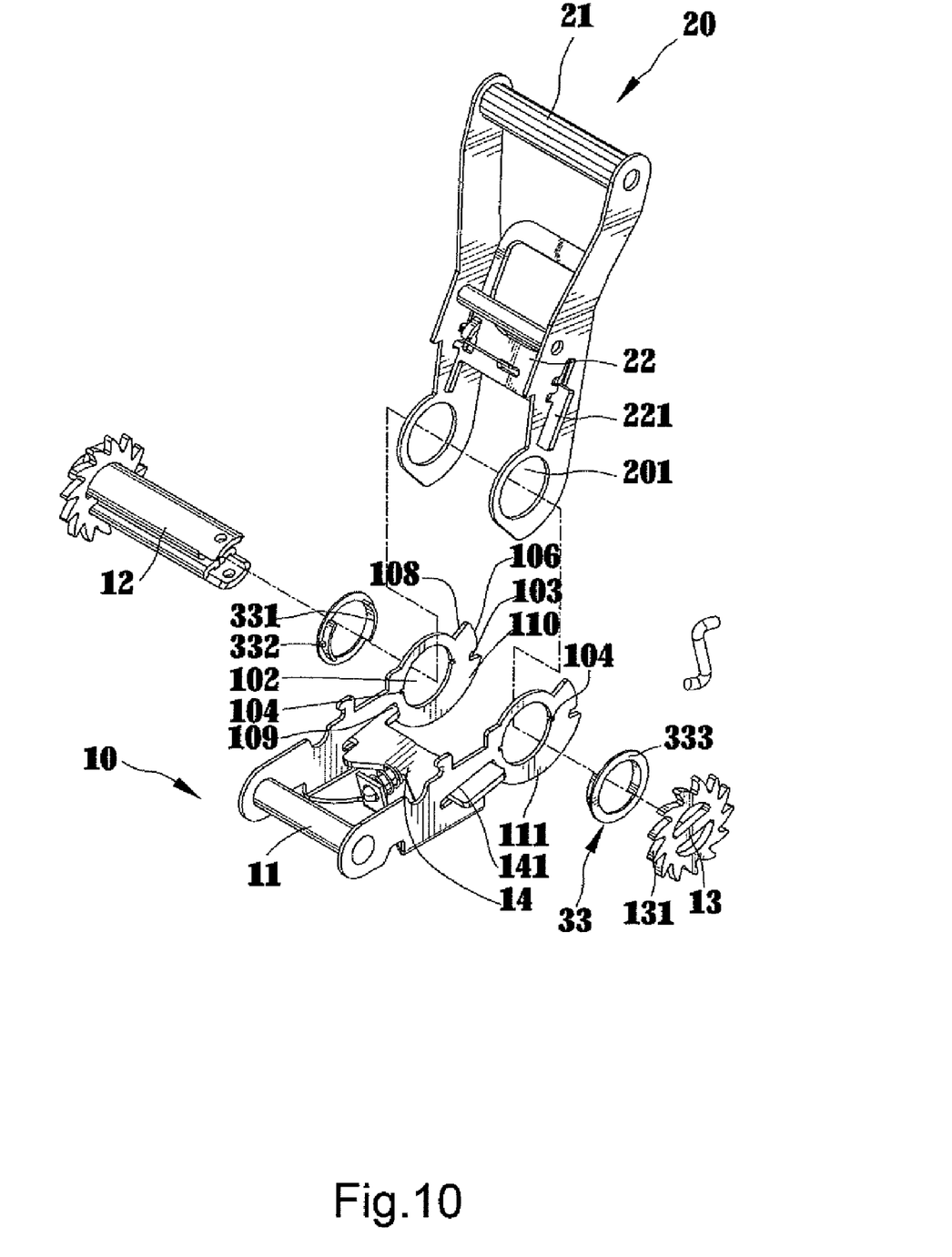
FIG. 10 is an exploded perspective view of a fastener according to the fourth embodiment of the present invention.

Referring to FIG. 10, there is shown a fastener according to a fourth embodiment of the present invention. The fourth embodiment differentiates from the first embodiment in that the two bushings 30 are replaced by two bushings 33. Each of the bushings 33 includes two arched ridges 331, two bosses 332 and a retaining surface 333. The arched ridges 331 are adapted to insert through the aperture 102 of the frame 10, and the retaining surface 333 is adapted to abut against the second side 111 of the wall so as to keep the bushing 33 connected to the frame 10. Each boss 332 is adapted to insert in the indentation 104 formed on each wall of the frame 10 so that the bushings 33 are not rotatable with respect to the frame 10.

The fastener according to the present invention exhibits advantages. Firstly, the reeling out is easy, since the bushings are provided to keep the reel 12 from the handle 20.

Secondly, the reeling out is easy, since the bushings are provided to keep the reel 12 from the frame 10.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. A fastener comprising:
   a frame including first and second walls on a floor;
   a handle;
   a reel inserted through the first and second walls of the frame and through the handle, wherein the reel includes a proximal end and a distal end;
   first and second bushings connected to the first and second walls of the frame, wherein each of the first and second bushings include two bosses formed thereon for preventing the bushing from rotation with respect to the frame, wherein the first and second bushings receive the proximal and distal ends of the reel for preventing the frame and the handle from clamping the reel;
   first and second ratchet wheels connected to the proximal and distal ends of the reel respectively, with the first and second ratchet wheels being fixed to and rotatable with the reel, with the handle rotatably mounted upon the reel;
   a first detent movable on the frame for engagement with the ratchet wheels;
   a second detent movable on the handle for engagement with the ratchet wheels; and
   a strap inserted through and wrapped around the reel intermediate the first and second walls of the frame, wherein the strap can be reeled when the reel is rotated.

2. The fastener according to claim 1 wherein each of the first and second bushings includes a retaining surface, with each of the first and second walls defining a first side and a second side, wherein the retaining surface abuts against the first side of one of the first and second walls.

3. The fastener according to claim 1 wherein each of the first and second bushings includes a retaining surface, with each of the first and second walls defining a first side and a second side, wherein the retaining surface abuts against the second side of one of the first and second walls.

4. The fastener according to claim 1 wherein the first and second walls of the frame and the first and second bushings are both intermediate the first and second ratchet wheels.

5. A fastener comprising:
   a frame including first and second walls on a floor, wherein each of the first and second walls includes an aperture;
   a handle;
   a reel inserted through the first and second walls of the frame and through the handle, wherein the reel includes a proximal end and a distal end;
   first and second bushings non-rotationally connected to the first and second walls of the frame, wherein each of the first and second bushings includes an annular ridge inserted through the aperture of one of the first and second walls of the frame, wherein the annular ridges of the first and second bushings receive the proximal and distal ends of the reel respectively for preventing the frame and the handle from clamping the reel;
   first and second ratchet wheels connected to the proximal and distal ends of the reel respectively, wherein the first and second ratchet wheels are fixed to and rotatable with the reel, wherein the handle is rotationally connected to the reel;
   a first detent movable on the frame for engagement with the ratchet wheels;
   a second detent movable on the handle for engagement with the ratchet wheels; and
   a strap inserted through and wrapped around the reel intermediate the first and second walls of the frame, wherein the strap can be reeled when the reel is rotated.

6. The fastener according to claim 5 wherein each of the first and second bushings includes a retaining surface, with each of the first and second walls defining a first side and a second side, wherein the retaining surface abuts against the second side of one of the first and second walls.

7. The fastener according to claim 5 wherein each of the first and second bushings includes a retaining surface, with each of the first and second walls defining a first side and a second side, wherein the retaining surface abuts against the first side of one of the first and second walls.

8. The fastener according to claim 5 wherein the aperture includes two indentations, wherein each of the first and second bushings includes two bosses inserted in the two indentations.

9. A fastener comprising:
   a frame including first and second walls on a floor, wherein each of the first and second walls includes an aperture;
   a handle;
   a reel inserted through the first and second walls of the frame and through the handle, wherein the reel includes a proximal end and a distal end;
   first and second bushings non-rotationally connected to the first and second walls of the frame, wherein each of the first and second bushings includes two circumferentially spaced arched ridges inserted through the aperture of one of the first and second walls of the frame, wherein the arched ridges of the first and second bushings receive the proximal and distal ends of the reel respectively for preventing the frame and the handle from clamping the reel;
   first and second ratchet wheels connected to the proximal and distal ends of the reel respectively, wherein the first and second ratchet wheels are fixed to and rotatable with the reel, wherein the handle is rotationally connected to the reel;
   a first detent movable on the frame for engagement with the ratchet wheels;
   a second detent movable on the handle for engagement with the ratchet wheels; and
   a strap inserted through and wrapped around the reel intermediate the first and second walls of the frame, wherein the strap can be reeled when the reel is rotated.

10. The fastener according to claim 9 wherein the aperture includes two indentations, wherein each of the first and second bushings includes two bosses inserted in the two indentations.

* * * * *